(12) United States Patent
Panis et al.

(10) Patent No.: US 10,896,106 B2
(45) Date of Patent: Jan. 19, 2021

(54) BUS SYNCHRONIZATION SYSTEM THAT AGGREGATES STATUS

(71) Applicant: Teradyne, Inc., North Reading, MA (US)

(72) Inventors: Michael C. Panis, Somerville, MA (US); Jeffrey S. Benagh, Melrose, MA (US); Richard Pye, Burlington, MA (US)

(73) Assignee: Teradyne, Inc., North Reading, MA (US)

( * ) Notice: Subject to any disclaimer, the term of this patent is extended or adjusted under 35 U.S.C. 154(b) by 165 days.

(21) Appl. No.: 15/976,407

(22) Filed: May 10, 2018

(65) Prior Publication Data

US 2019/0347175 A1 Nov. 14, 2019

(51) Int. Cl.
| | | |
|---|---|---|
| *G06F 11/00* | (2006.01) | |
| *G06F 11/22* | (2006.01) | |
| *G06F 13/42* | (2006.01) | |
| *G06F 11/273* | (2006.01) | |

(52) U.S. Cl.
CPC .......... *G06F 11/221* (2013.01); *G06F 11/273* (2013.01); *G06F 13/42* (2013.01)

(58) Field of Classification Search
CPC ..... G06F 11/221; G06F 11/263; G06F 11/273
See application file for complete search history.

(56) References Cited

U.S. PATENT DOCUMENTS

| | | |
|---|---|---|
| 4,229,792 A | 10/1980 | Jensen et al. |
| 5,235,698 A | 8/1993 | Lan |
| 5,359,237 A | 10/1994 | Pye |
| 5,371,880 A | 12/1994 | Bhattacharya |
| 5,471,136 A | 11/1995 | Pye |
| 5,604,751 A | 2/1997 | Panis |
| 5,615,219 A | 3/1997 | Keating et al. |
| 5,938,780 A | 8/1999 | Panis |
| 6,389,547 B1 | 5/2002 | James et al. |
| 6,550,036 B1 | 4/2003 | Panis |
| 6,629,174 B1 | 9/2003 | Farkas et al. |
| 6,981,192 B2 | 12/2005 | Panis et al. |
| 7,017,087 B2 | 3/2006 | Panis et al. |
| 7,334,065 B1 | 2/2008 | Rose et al. |
| 7,337,377 B2 | 2/2008 | Panis et al. |

(Continued)

FOREIGN PATENT DOCUMENTS

EP 1959456 A1 8/2008

OTHER PUBLICATIONS

International Search Report for PCT/US2019/028247, 4 pages (dated Aug. 9, 2019).

(Continued)

*Primary Examiner* — Elmira Mehrmanesh
(74) *Attorney, Agent, or Firm* — Burns & Levinson LLP

(57) ABSTRACT

An example test system includes instruments for controlling testing. Each instrument may be controlled by a processing unit. Each processing unit may be configured to operate on portions of a test program relevant to an instrument that the processing unit controls. A synchronization mechanism operates with at least some processing units to produce a synchronized sequence of actions, measurements, or measurements and actions at a test instrument interface absent intervention from a centralized controller.

38 Claims, 5 Drawing Sheets

(56) References Cited

U.S. PATENT DOCUMENTS

| | | |
|---|---|---|
| 7,349,818 B2 | 3/2008 | Panis |
| 7,519,490 B2 | 4/2009 | Panis |
| 7,528,623 B2 | 5/2009 | Zellner et al. |
| 7,606,675 B2 | 10/2009 | Panis |
| 7,668,235 B2 | 2/2010 | Panis et al. |
| 7,673,084 B2 | 3/2010 | Krampl et al. |
| 7,769,559 B2 * | 8/2010 | Reichert .............. G01R 31/319 702/118 |
| 7,769,932 B2 | 8/2010 | Nichols |
| 7,940,743 B2 | 5/2011 | Seisenberger et al. |
| 7,949,777 B2 | 5/2011 | Wallace et al. |
| 8,285,897 B2 * | 10/2012 | Weigold ................ G06F 13/426 710/100 |
| 8,504,864 B2 | 8/2013 | Menon et al. |
| 8,615,673 B2 * | 12/2013 | Shouba .............. G01R 31/2834 713/400 |
| 8,656,045 B2 | 2/2014 | Wallace et al. |
| 8,762,095 B2 * | 6/2014 | Van Wagenen ............................. G01R 31/31907 702/117 |
| 8,850,258 B2 | 9/2014 | Lossin et al. |
| 8,914,563 B2 | 12/2014 | Martin et al. |
| 8,947,537 B2 | 2/2015 | Lewinnek et al. |
| 9,397,670 B2 * | 7/2016 | van der Wagt ....... H03L 7/0802 |
| 9,641,267 B2 | 5/2017 | Jin et al. |
| 9,672,177 B2 | 6/2017 | Poulsen |
| 9,830,298 B2 | 11/2017 | Tsfaty et al. |
| 9,977,079 B2 | 5/2018 | Swoboda |
| 10,048,304 B2 | 8/2018 | King et al. |
| 10,128,783 B2 | 11/2018 | Bogus et al. |
| 10,162,790 B2 | 12/2018 | Wei |
| 10,212,016 B2 | 2/2019 | Shao et al. |
| 10,345,418 B2 | 7/2019 | Wadell et al. |
| 2002/0087924 A1 | 7/2002 | Panis et al. |
| 2004/0064765 A1 | 4/2004 | Panis |
| 2005/0102592 A1 | 5/2005 | Jones et al. |
| 2006/0123304 A1 | 6/2006 | Panis et al. |
| 2007/0118315 A1 | 5/2007 | Panis et al. |
| 2007/0118316 A1 | 5/2007 | Panis |
| 2008/0076761 A1 | 3/2008 | Jamieson |
| 2008/0117960 A1 | 5/2008 | Panis |
| 2008/0125991 A1 | 5/2008 | Panis |
| 2008/0189060 A1 | 8/2008 | Zellner et al. |
| 2008/0229163 A1 * | 9/2008 | Niijima .................. G11C 29/56 714/719 |
| 2011/0275170 A1 * | 11/2011 | Van Wagenen .............................. G01R 31/31907 438/14 |
| 2015/0089098 A1 * | 3/2015 | Foster ....................... G06F 1/12 710/61 |
| 2016/0041941 A1 * | 2/2016 | Kessler ................... G06F 1/266 700/3 |
| 2016/0227004 A1 | 8/2016 | Conner |
| 2017/0180069 A1 | 6/2017 | Leng |

OTHER PUBLICATIONS

Written Opinion for PCT/US2019/028247, 6 pages (dated Aug. 9, 2019).

* cited by examiner

BUS SYNCHRONIZATION SYSTEM THAT AGGREGATES STATUS

TECHNICAL FIELD

This specification relates generally to a bus synchronization system.

BACKGROUND

Automatic test equipment (ATE) includes electronics for sending signals to, and for receiving signals from, a device under test (DUT) in order to test the operation of the DUT. In some examples, testing a DUT involves multiple tests. The ATE may include multiple instrument modules, each of which may contain one or more instrument module resources that may be configured to perform one or more of the tests. In some examples, each test may require different resources to be used to test the same DUT, and different tests may require different combinations of resources. In some examples, multiple DUTs may be tested at the same time. In some examples, multiple resources may be dedicated to testing a particular DUT. In some examples, multiple resources may be shared to perform testing on multiple DUTs.

SUMMARY

An example bus synchronization system comprises a computer bus, a host computer to execute test flows, and instrument modules. An instrument module comprises resources and a processing device. Resources operated on by a test flow define a domain. The host computer is configured to output commands including a sync command in the test flow to the instrument modules. The sync command is for causing the instrument module to provide a status to the computer bus and to pause the processing device. Statuses from the instrument modules in the domain are aggregated on the computer bus. Information is distributed to the instrument modules based on the statuses aggregated. The processing device is configured to resume executing commands based on the information. The example system may include one or more of the following features, either alone or in combination.

The information may be distributed after all instrument modules in the domain have encountered a sync command. The host computer may be programmed to send the commands to the instrument modules via a communication bus that is different from the computer bus. Aggregating the status and distributing the information may be performed independent of the host computer. At least some of the commands may instruct resources in the domain to perform operations.

The instrument module may comprise a first type of endpoint device to provide status to the computer bus. The first type of endpoint device may comprise a contributing endpoint device. The contributing endpoint device may be configured to receive the information from the computer bus and to generate a signal based on the information to trigger operation of one or more of the resources.

The instrument module may comprise a second type of endpoint device. The second type of endpoint device may comprise a non-contributing endpoint device to receive the information from the computer bus and to generate a signal based on the information to trigger operation of one or more of the resources.

The host computer may be programmed to execute a test program that includes multiple, separate instruction flows. The multiple, separate instruction flows may include the test flow. An endpoint device may be configured to subscribe to one or more of the multiple, separate flows. The endpoint device may be configured to generate a signal to provide to resources in the domain. The signal may be used to trigger the resource to perform an action for which the resource has been previously armed. An offset may be added to the signal to control signal timing relative to receipt of the information. The endpoint device may comprise a transmitter to implement output to the computer bus, and a receiver to implement receiving from the computer bus.

A status may comprise a pass or fail status of a test performed by the processor. The status may comprise bits that are encoded in time-division-multiple-access fashion onto the computer bus using a periodic frame comprised of multiple bits. The periodic frame may be characterized by one or more of headers, trailers, cyclic redundancy checks, or 8b/10b encoding.

At least some of the bits of the information may represent a system time alignment signal to set system clock counters on the instruments to at least one of a specified value or a specified time that is in a payload on the computer bus. The computer bus may comprise at least one of a wired-OR bus; point-to-point connections and logic gates; non-contact, wireless or optical signaling media; or a combination of one or more of: a wired-OR bus; point-to-point connections and logic gates; non-contact, and wireless or optical signaling media.

The information may be received over the computer bus. The information may be received over a communication bus that is different than the computer bus. The sync command in the test flow may immediately precede, in the test flow, a command requiring action or measurement vis-à-vis a device under test by the test flow. At least part of the test flow may be controllable not to be synchronized.

An example bus synchronization system comprises a computer bus and instrument modules. An instrument module comprises resources and a processing device to execute commands from a queue. The processing device is configured, in response to encountering at least one sync command in the queue, to cause the instrument module to provide a status to the computer bus and to pause the processing device. Statuses from the instrument modules are aggregated on the computer bus. Information is distributed to the instrument modules based on the statuses aggregated. The processing device is configured to resume executing commands based on the information. The example system may comprise a host computer and a communication bus. The host computer may be configured to output the commands to the instrument module via the communication.

An example test system comprises instruments for controlling testing. Each instrument may be controlled by a processing unit. Each processing unit may be configured to operate on portions of a test program relevant to an instrument that the processing unit controls. A synchronization mechanism is configured to operate using at least some processing units to produce a synchronized sequence of actions, measurements, or measurements and actions at a test instrument interface absent intervention from a centralized controller. The example system may include one or more of the following features, either alone or in combination.

The synchronization mechanism may be configured to: enable each processing unit to transmit status data indicating whether the processing unit has completed a portion of the test program; to receive and to aggregate status data across all processing units; and to transmit one or more aggregated status bits back to all processing units. A processing unit may be configured to perform operations comprising: when the processing unit has completed a portion of the test program, the processing unit indicates, on a synchronization bus, that the processing unit has completed the portion of the test program. Before proceeding to a next portion of the test program, the processing unit receives the one or more aggregated status bits indicating that all other processing units in the test system have completed portions of the test program.

The synchronization mechanism may have a defined timing relative to system clocks so that multiple instruments can receive the one or more aggregated status bits and be triggered to perform an action, a measurement, or both an action and a measurement with predictable and repeatable timing alignment among multiple instruments. The synchronization mechanism may be configured to support status data comprising multiple status bits that are transmittable by each processing unit, and that can be aggregated to produce the one or more aggregated status bits. The one or more aggregated status bits may be transmitted to all of the processing units. The one or more aggregated status bits may be usable to synchronize all instruments in the test system to synchronize a sequence of actions, a sequence of measurements, or a sequence of actions and measurements.

The status data may comprise at least one bit to transmit pass or fail status of a test program. The status data may comprise one or more status bits that are encoded in time-division-multiple-access fashion onto a serial data bus using a periodic frame. The periodic frame may be characterized by one or more of headers, trailers, cyclic redundancy checks, or 8b/10b encoding. The periodic frame may be configurable to transmit information other than the one or more status bits.

One or more bit transmitted to the processing units may represent a system time alignment signal to set system clock counters on the instruments to a specified value. The one or more aggregated status bits may comprise a single status bit to synchronize all instruments in the test system to synchronize a sequence of actions, a sequence of measurements, or a sequence of actions and measurements.

The synchronization mechanism may comprise at least one of a wired-OR bus; point-to-point connections and logic gates; non-contact, wireless or optical signaling media; or a combination of one or more of: a wired-OR bus; point-to-point connections and logic gates; non-contact, and wireless or optical signaling media. At least part of the synchronization mechanism may be controllable to be disabled either automatically or manually. At least part of the synchronization mechanism may be controllable to operate on only part of the test program.

Advantages of the example systems may include one or more of the following. Providing one or more processors (for example, a single processor) for a small number of resources may allow that group of resources to operate independently and in parallel with all other resources. In addition, providing one or more processors (for example, a single processor) for small number of resources may also reduce communications latency between the processor(s) and resource(s). The synchronization system addresses possible synchronization issues associated with providing one or more processors as described. The synchronization system also allows finer granularity than one group of resources per processor to be synchronized to any other groups of resources in the system. The synchronization system may also eliminate the need for a central controller to implement synchronization as described herein.

Any two or more of the features described in this specification, including in this summary section, can be combined to form implementations not specifically described herein.

The systems and techniques and processes described herein, or portions thereof, can be implemented as/controlled by a computer program product that includes instructions that are stored on one or more non-transitory machine-readable storage media, and that are executable on one or more processing devices to control (e.g., coordinate) the operations described herein. The systems and techniques and processes described herein, or portions thereof, can be implemented as an apparatus, method, or electronic system that can include one or more processing devices and memory to store executable instructions to implement various operations.

The details of one or more implementations are set forth in the accompanying drawings and the description below. Other features, objects, and advantages will be apparent from the description and drawings, and from the claims.

DESCRIPTION OF THE DRAWINGS

Like reference numerals in different figures indicate like elements.

DETAILED DESCRIPTION

Described herein are example implementations of a bus synchronization system and components thereof. In some implementations, the bus synchronization system is incorporated into a test system, such as ATE; however, the bus synchronization system is not limited to use with a test system or to testing in general.

An example test system includes multiple instrument modules (or simply, "instruments") for performing testing on DUTs. Each instrument module includes one or more resources, such as radio frequency (RF) signal generators, microwave signal generators, processors, power supplies, memory, and so forth. Generally, an instrument module resource (or simply, "resource") may be, or include, any appropriate type of electronic hardware device or software for receiving, transmitting, processing, storing, or otherwise acting upon digital data, analog signals, or both digital data and analog signals. The resources are each controlled by one or more module embedded processors (MEP or "processing unit") on an instrument module. The use of multiple MEPs allows the example test system to be split into multiple parts executing different test flows in parallel.

Figure 1:
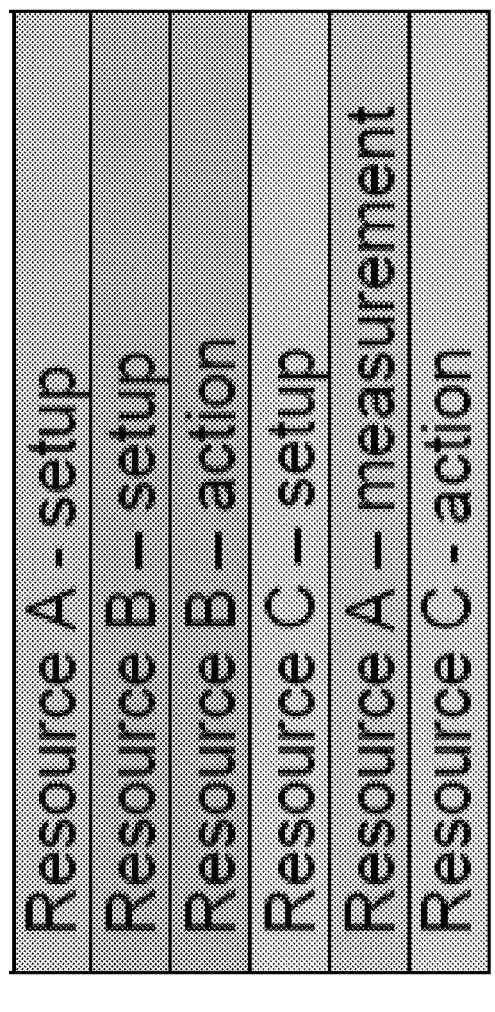
FIG. 1 is a block diagram showing an example sequence of commands.
Figure 2:
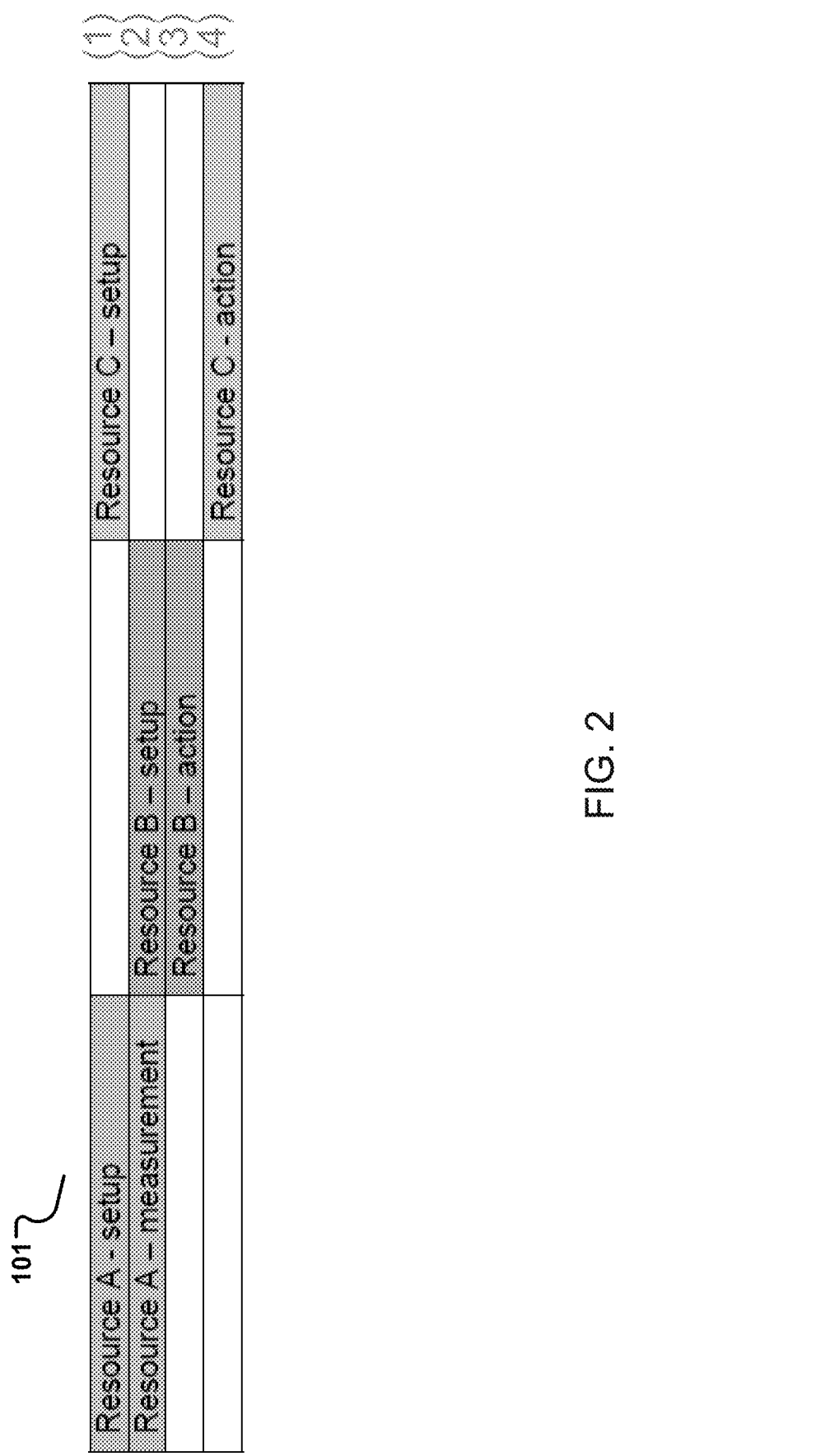
FIG. 2 is a block diagram showing an example order in which the sequence of commands of FIG. 1 may be executed.

The use of multiple MEPs can lead to synchronization issues. In this regard, individual MEPs execute commands for a test flow from a command queue. While commands in the queue are executed in order, commands across multiple queues and across multiple resources execute in no defined order. Consider the sequence of commands 100 shown in FIG. 1, which are executable by different system resources A, B, and C that potentially reside on different instrument modules. In FIGS. 1 and 2, each block represents a time slot in which execution occurs. In this example, absent synchronization, the commands shown in FIG. 1 could be executed by the resources in order 101 of FIG. 2, which is not the intended order. The example synchronization process described herein addresses this issue, and enables commands in the same test flow to be executed in an appropriate order (e.g., the commands of row 1 then row 2 then row 3 then row 4).

As an overview, in an example synchronization process, a host computer on the test system executes a test flow for a DUT. The test flow may include, for example, commands or other instructions for implementing testing on all or part of the DUT. In this regard, an example DUT, such as a semiconductor device, may include multiple components, such as digital components, analog components, wireless components, and so forth. In this example, the test flow is to execute on the different components concurrently. The different components, however, may require different instrument module resources for testing, such as analog testing resources, digital testing resources, wireless testing resources, and so forth. These resources required by the test flow constitute a test domain that that may require synchronization. For example, synchronization may be implemented so that different tests performed on different components of the DUT occur contemporaneously or concurrently.

The instrument module resources that comprise a test domain may reside on the same instrument module, on different instrument modules, or on a combination of the same instrument module and different instrument modules The resources that comprise a test domain may be a subset of all instrument module resources in the test system. In any given test system, there may be multiple test flows, e.g., used to test different components of a DUT or DUTs, and thus multiple test domains. Each of these multiple test domains may include different combination(s) of instrument module resources. Different instrument module resources, corresponding to different test domains, may be synchronized independently using the process described herein.

A test domain having instrument module resources that are synchronized may map to, and may be referred to as, a "sync" (synchronized) domain. For the examples described herein, the two terms may be used interchangeably. As noted, each instrument module includes at least one MEP. The MEP may be configured to, e.g., programmed to, execute commands to implement testing. Each instrument module may include one endpoint that constitutes an interface, for example, a hardware interface, to a synchronization (sync) bus, and a sync resource driver (SRD) that constitutes an interface, for example, a software interface, to the sync bus.

In some implementations, the sync bus may be implemented using one or more time-division multiplexed (TDM) computer buses or other appropriate transmission media. In some implementations, the sync bus is separate from, and independent of, communications media used to transmit commands for the test flows. The sync bus may include logic gates built into its distribution hardware, which may have a tree topology, with a sync bus master at a root of the tree. As described herein, the sync bus master is configured to synchronize instrument module resources in the same sync domain. In some examples, the sync bus is primarily responsible for synchronization. The host computer is not directly involved in synchronization. Rather, the host computer's roles include determining a series of commands that will be executed by instrument modules in a test domain, and placing appropriate synchronization commands—called sync barriers—in the proper positions within each series of commands for a sync domain. In some examples, the position of the synchronization command can be determined by a user of the test system. In some examples, the host computer also inserts commands that tell the endpoints to subscribe instrument modules to and from sync domains. In some examples, all instruments are configured to subscribe, automatically, to all or some sync domains and, therefore, there is no need for the host computer to insert commands that tell the endpoints to subscribe instrument modules to and from sync domain.

In an example, the host computer communicates a series of commands for a test flow to each instrument module having resources required by the test flow over communication media other than the sync bus. For each of the instrument modules, its MEP stores the series of commands in a queue in computer memory. The queue may be dedicated to a particular sync domain. Thus, the commands are not received from the host computer. The commands include sync barrier commands.

In some implementations, only those commands that require action or measurement vis-à-vis the DUT need be synchronized. Therefore, in some examples, only those command are preceded by a sync barrier command in an instruction stream of a test flow. Examples of such commands are device interface board (DIB)—visible commands. A DIB is the interface between the test system and the DUT, for example, a board to which the DUT is mated and through which signals pass between the DUT and the test system. DIB-visible is a generic name given to any command that could have an effect that could be observed at the DUT or, more precisely the DIB, or vice-versa, where a result of a measurement could depend on what happens on the DIB. Some setup commands may not require synchronization. For example, certain measurement parameters like sample rate or a number of samples to capture, or various parameters of pattern bursts, are not observable from the DIB and do not require synchronization. In some implementations, synchronization is not limited to commands that require action or measurement vis-à-vis the DUT.

In some implementations, the host computer places a sync barrier command (or simply, "sync barrier") in a series of commands immediately before a DIB-visible command or before any other type of command that requires synchronization. In some examples, the sync barrier command is placed in the test flow of an instrument module in advance, for example, by a test engineer who developed the test program. To execute the commands, the MEP retrieves them from the queue, and executes the command or performs whatever other operation is necessary with respect to the commands. When the MEP encounters a sync barrier in the queue, the MEP outputs, via an appropriate endpoint, a "sync barrier reached" command (or simply, "sync barrier reached") to the sync bus. The sync barrier reached command may be comprised of one or multiple status bits. At this point, the MEP suspends execution of commands in the queue. Thus, the MEP has completed a portion of the test program and it indicates, via the sync barrier reach command, that it has completed the portion of the test program. Before proceeding to the next portion of the test program, the MEP waits to receive an aggregated status information (e.g., aggregated status bits) indicating that all other processing units have completed their respective portions of the test program.

On the sync bus—independent of the host computer—the sync bus master combines "sync barrier reached" commands from each of the endpoints of the instrument modules in the same sync domain. For example, the sync bus master may perform a logical "AND" of all of received "sync barrier reached" commands, or perform other appropriate processing. When the sync bus master determines that each of the endpoints of the instrument modules in the same sync domain have output the "sync barrier reached" command, the sync bus master outputs a "sync barrier crossed" command (or simply, "sync barrier crossed") over the sync bus. The "sync barrier crossed" command may be a single status bit or may comprise multiple status bits, and may constitute an aggregated status of the received "sync barrier reached" commands.

Each sync bus endpoint in that sync domain receives the "sync barrier crossed" command, and generates a trigger signal to trigger operation of the instrument module resources in that domain. The trigger signal triggers operation of the instrument module resources to operate synchronously. The actual operation performed by each of the instrument module resources may be different. The MEP also resumes execution of commands in the queue following receipt of the "sync barrier crossed" command.

Thus, in this example, the example bus synchronization system allows all instrument module resources in the same test/sync domain to operate at the same time. Furthermore, the example bus synchronization system can be used by multiple instrument module resources that operate independently of each other. As such, central coordination, for example by the host computer, among multiple different resources is unnecessary to perform synchronization in some examples.

In the foregoing example, each instrument module may include more than one endpoint. The endpoints in an instrument module include a contributing endpoint. A contributing endpoint includes hardware that is configured to receive, from the instrument module's MEP, a synchronization status, such as the "sync barrier reached" command, and to provide that synchronization status to the sync bus. In some implementations, the status output to the sync bus may be, or include, one or more bits representing pass or fail status of a test performed using MEPs in the test system. In some examples, the output of data representing pass or fail status or other types of status can be triggered at any time, independent of a sync barrier command. The contributing endpoint is also configured to receive information that indicates when all instrument module resources in a sync domain are "ready", e.g., the "sync barrier crossed" command, and to provide this information to the instrument module resources in the same sync domain. The instrument module may also include, zero, one, or multiple non-contributing endpoints. A non-contributing endpoint includes hardware that is configured to receive information that indicates when all instrument module resources in a sync domain are "ready", e.g., "sync barrier crossed", and to provide this information to the instrument module resources. The non-contributing endpoint, however, does not transmit over the sync bus, nor does it provide information to the MEP.

In some implementations, the status provided by the contributing endpoint comprises bits that are encoded in time-division-multiple-access fashion onto a serial data bus—e.g., the sync bus—using a periodic frame comprised of multiple bits. In some implementations, the frame may include optional headers, trailers, cyclic redundancy checks, may use 8b/10b encoding, and may employ any appropriate mechanisms that may be associated with serial data transmission. In some implementations, the frame may be used to transmit or to receive other types of information over the same physical wires, for example, using a frame type indicator in the frame header to specify which type of information is being transmitted.

Figure 3:
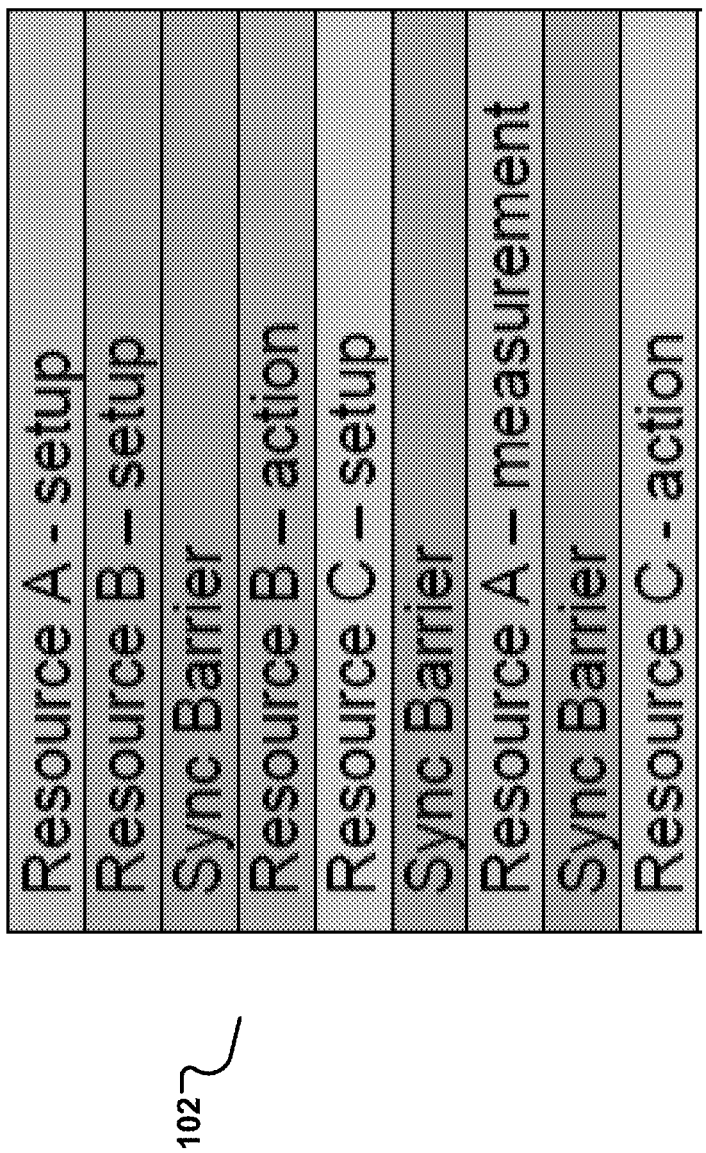
FIG. 3 is a block diagram showing an example order in which commands, including "sync barriers" applied by a bus synchronization system, are encountered.
Figure 4:
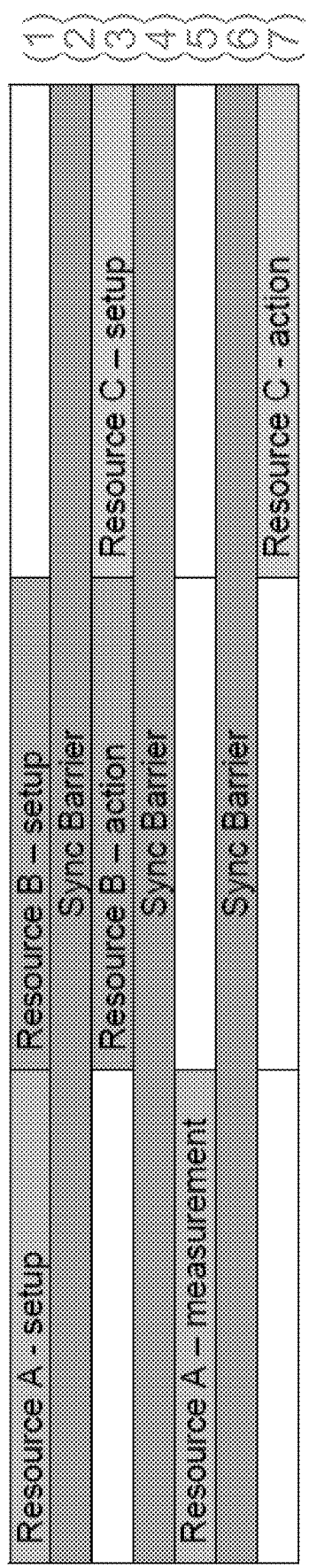
FIG. 4 is a block diagram showing an example order in which the sequence of commands of FIG. 3 may be executed.

Referring also to FIGS. 1 and 2, FIG. 3 shows an example order 102 in which commands, including "sync barriers" applied by the bus synchronization system described herein, are encountered. In FIGS. 3 and 4, as was the case with respect to FIGS. 1 and 2, each block represents a time slot in which execution occurs. Using the system described herein, the "sync barriers" are encountered, and synchronization of instrument module resources in the same sync domain is implemented. This results in the commands executing in order 104 of FIG. 4 (e.g, the commands of row 1 then row 2 then row 3 then row 4 then row 5 then row 6 then row 7). As shown, the "sync barrier" is used to control when commands are executed on different resources A, B, and C, enabling the commands in the same sync domain to be executed in the appropriate order across multiple, independent resources. The example of FIGS. 3 and 4 shows that all resources will wait for all other resources in their test domain to finish executing commands and to reach a sync barrier before they execute additional commands.

Figure 5:
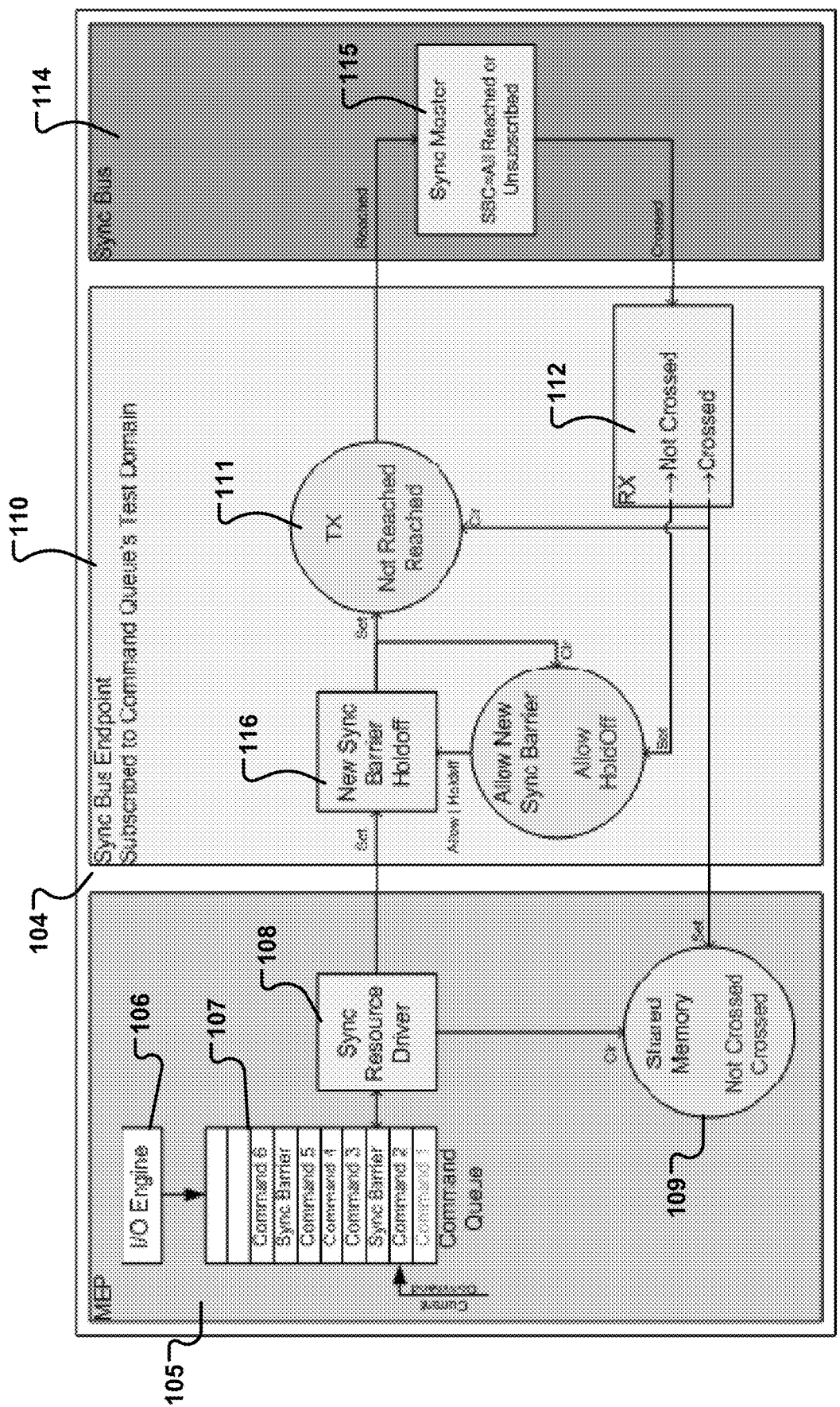
FIG. 5 is a block diagram of components that may be included in an example bus synchronization system.

FIG. 5 shows, for an instrument module 104, a MEP 105 containing an I/O (input/output) engine 106, a command queue 107, an SRD 108, and shared memory 109. The instrument module contains a sync bus endpoint 110 (e.g., a contributing endpoint) containing a transmitter (TX) 111 and a receiver (RX) 112. FIG. 5 also shows a sync bus 114, which includes a TDM bus and a sync bus master 115.

In the example of FIG. 5, the endpoint may operate on commands for the multiple, different domains. In this example, the MEP's I/O engine places commands received from the host computer into the command queue. MEP 105 receives test flow commands from a host computer sent over a communication bus. This communication bus is not the sync bus, but rather may be an Ethernet bus or any other appropriate communications media, including wired and wireless media. In some example, commands on an instrument module are pre-stored, e.g., in a command queue, and are not received from a host computer. In an example, MEP 105 includes one or more processing devices configured to, e.g., programmed to, control a single instrument module of the test system. Examples of processing devices are described herein. In an example, for each of a MEP's test domains, there is a separate command queue. One or more SRDs running on the MEP retrieve commands for a sync domain from a command queue and process/execute the commands.

In an example operation, when the next command in a queue to be executed is a "sync barrier", the SRD sets a state of the shared memory to "sync barrier not crossed", since a previous crossing might have left the state set to "sync barrier crossed". The SRD then instructs the sync bus endpoint that a "sync barrier" has been reached, and starts waiting for the shared memory to indicate that the "sync barrier" has been crossed. The sync bus endpoint may delay 116 transmitting this status if it is not ready; otherwise, the sync bus endpoint sets the sync bus endpoint transmit status to "sync barrier reached", and transmits this command onto the sync bus. The sync bus transmits the command to the sync bus master, as described herein.

The sync bus master aggregates sync barrier status (e.g., "sync barrier reached" commands) received from multiple, e.g., all, resources in a sync domain. When all resources in the sync domain have reported "sync barrier reached", the sync bus master provides information, e.g., the "sync barrier crossed" command to sync bus receivers in that sync domain. As described, the sync bus master may aggregate (e.g., logically ANDs) the statuses from all endpoints in the sync domain and produces one result per sync domain. In this example, as noted, the resulting "sync barrier crossed" status is TRUE if all the sync bus endpoints in the test domain report "sync barrier reached". The "sync barrier crossed" command is then sent from the sync bus master to each of the sync bus endpoint receivers over the sync bus, which all receive that command.

When a sync bus endpoint receiver at an instrument module detects the "sync barrier crossed" command, the sync bus endpoint receiver performs two operations in this example. The sync bus endpoint receiver sets the sync bus endpoint transmitter's status to "sync barrier not reached" and writes "sync barrier crossed" to shared memory. The SRD, which has been waiting for this status change, then allows the MEP to process subsequent commands in the queue. As a result, MEPs of different instrument modules— all in the same sync domain—are able to synchronize operation.

In some implementations, after a sync bus endpoint transmitter reaches a sync barrier, the sync bus endpoint transmitter may hold its "sync bus reached status" until it is acknowledged by the sync bus master with a "sync barrier crossed" command.

Each sync bus endpoint may also be configured to receive sync bus commands, such as "sync barrier status crossed", from the sync bus, and to generate a trigger signal for the resources on the instrument module. For example, each resource may be configured to execute a specific subset of commands in response to a trigger signal. In some examples, the trigger signal triggers resources on different modules so that they perform actions at the same time, not just in the correct order. A trigger signal may be used to trigger a resource to perform an action for which the resource has been previously armed.

In some implementations, a sync domain creates only one trigger signal at a time, although a single trigger signal can be applied to multiple receiver outputs with different time delays. Each of these trigger signals can be applied to one of a number of (e.g., 32) instrument module resources. For example, a trigger signal for a sync domain can be applied to multiple instrument module resources, or a trigger signal for a sync domain can be applied to a single instrument module resource. Each endpoint receiver output may also introduce a unique trigger signal offset delay. Even if two endpoint receiver outputs are associated with the same sync domain, their offsets can be programmed differently to compensate for different paths in instrument module resources.

In some implementations, each sync bus frame contains a header that indicates the start of the frame and a type of message represented by the frame. This header may be followed by payload data that may represent the sync barrier status for each of one or more available test domains. In some examples, the sync frame may be clocked by, and directly referenced to, a clock signal. The size of the payload is determined by the number of available test domains. The more test domains, the larger the payload, and the longer it takes to propagate signals through the test system.

In some examples, the sync bus supports messages other than "sync barrier reached" and "sync barrier crossed". For example, the sync bus master can send a message instructing sync bus endpoints to update their time-of-day (TOD) clocks, and the sync bus endpoints can request the sync bus master to send them that update. A TOD clock is a system time alignment signal used to set system clock counters on each instrument to a specified value, such that all instruments set their clocks to the same specified value with exactly repeatable timing relative to the system clocks.

Thus, at any appropriate time, a sync bus endpoint transmitter can send a message, rather than sending its status, and at any appropriate time, the sync bus master can send a message rather than sending "sync barrier crossed". In some implementations, when the sync bus master receives a frame without a status, the sync bus master responds with a frame type that also does not contain a status. In some implementations, when a sync bus endpoint receiver receives a frame without a status, the sync bus endpoint receiver maintains its status from the previous frame. As a result, the previous frame's status is preserved.

In some implementations, a test system may have multiple MEPs—one per instrument module—or one MEP may serve multiple instrument modules. In the latter case, the MEP may configure one instrument module's sync bus endpoint as a contributing endpoint and use it to provide sync barrier status. In this case, the MEP may configure the sync bus endpoints on the other the modules to be non-contributing endpoints. In some implementations, the MEP may configure all the sync bus endpoints to be contributing and communicate sync barrier status with each sync bus endpoint independently. Thus, the synchronization system is configurable. It enables the same modules to be used in a lower cost system with slightly less functionality.

The example test system may support two related features: concurrent test flows and flow-per-site. In an example, concurrent test flows requires that multiple sections of a DUT are independent enough to be tested at the same time. A user of the test system may specify which tester resources are associated with each section of the DUT. A test program may be written with separate flows, each only using resources associated with one section of the DUT. Even though the host computer runs through these flows serially, the MEPs execute commands for the multiple flows in parallel.

Flow-per-site is similar to concurrent test flows, but instead of a user writing different flows, a single flow executes differently depending on the DUT's test results. The test program groups sites with the same results, and the test flow is executed serially, once for each group of sites. Commands executed during the flow may differ for each group. As the test program continues, flows may split again or rejoin. Resources executing a unique flow are considered members of a test domain. These resources operate synchronously with each other. Resources in different test domains may have limited, or no, synchronization to each other. A difference between the two features is that the test domains are known before test program execution for concurrent test flows, whereas they are dynamically created for flows-per-site.

In some implementations, the bus synchronization system may be configured so that a test engineer can disable automatic synchronization for at least part of a test program. In some implementations, the bus synchronization system is configured to identify, automatically, any portions of a test program that require synchronization to occur. For example, the identification may be made absent test engineer input.

In some implementations, the sync bus may be implemented using a wired-OR bus, using point-to-point connections and logic gates, using appropriate non-contact, wireless or optical signaling, or using an any appropriate combination of these transmission media. In some implementations, the sync bus may be implemented using any appropriate data communications pathway configured to communicate status to hardware or software, to aggregate the status, and to transmit the aggregated status or other information to all MEPs via the same pathway or via a different pathway.

In some implementations, bus synchronization need not be symmetric. For example, in some implementations, the "sync barrier crossed" signal, or other appropriate synchronization or other signals, could be sent to the instrument modules over an Ethernet bus, rather than over the sync bus as described above.

As described herein, the example bus synchronization system thus enables synchronized operation across multiple distributed MEPs, without the need for centralized control. This is possible even though the multiple distributed MEPs may take different amounts of time to execute their portions of a test program, and typically do not know in advance how long such processing will actually take. Thus, each MEP has flexibility in how long it will take to execute its portion of the test program—which might not be knowable in advance. The bus synchronization system also is relatively low latency, which may be advantageous since, for example, some test programs can include thousands of synchronization events per second.

In some implementations, each of MEPs may be configured to run its own copy of a test program, to determine where sync barriers should be placed into the command queue among the commands, and to determine the sync domains to which an instrument module containing the MEP should subscribe. This distributed approach could be implemented in lieu of, or in combination, with the approach described above, in which the host computer runs the test program and places the sync barrier commands in the proper positions within a series of commands for a sync domain.

The example systems described herein may be implemented by, and/or controlled using, one or more computer systems comprising hardware or a combination of hardware and software. For example, a system like the ones described herein may include various controllers and/or processing devices located at various points in the system to control operation of the automated elements. A central computer may coordinate operation among the various controllers or processing devices. The central computer, controllers, and processing devices may execute various software routines to effect control and coordination of the various automated elements.

The example systems described herein can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing can be performed by one or more programmable processors executing one or more computer programs to perform the functions described herein. All or part of the testing can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any "electrical connection" as used herein may imply a direct physical connection or a wired or wireless connection that includes or does not include intervening components but that nevertheless allows electrical signals to flow between connected components. Any "connection" involving electrical circuitry that allows signals to flow, unless stated otherwise, is an electrical connection and not necessarily a direct physical connection regardless of whether the word "electrical" is used to modify "connection".

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A system comprising:
a computer bus;
a host computer to execute test flows; and
instrument modules, an instrument module comprising:
resources; and
a processing device;
wherein resources operated on by a test flow define a domain;
wherein the host computer is configured to output commands including a sync command in the test flow to the instrument modules, the sync command for causing the instrument module to provide a status to the computer bus and to pause the processing device;
wherein statuses from the instrument modules in the domain are aggregated on the computer bus, and wherein information is distributed to the instrument modules based on the statuses aggregated;
wherein the processing device is configured to resume executing commands based on the information;

wherein the instrument module comprises an endpoint device to provide status to the computer bus;
wherein the endpoint device comprises a contributing endpoint device; and
wherein the contributing endpoint device is configured to receive the information from the computer bus and to generate a signal based on the information to trigger operation of one or more of the resources.

2. A system comprising:
a computer bus;
a host computer to execute test flows; and
instrument modules, an instrument module comprising:
resources; and
a processing device;
wherein resources operated on by a test flow define a domain;
wherein the host computer is configured to output commands including a sync command in the test flow to the instrument modules, the sync command for causing the instrument module to provide a status to the computer bus and to pause the processing device;
wherein statuses from the instrument modules in the domain are aggregated on the computer bus, and wherein information is distributed to the instrument modules based on the statuses aggregated;
wherein the processing device is configured to resume executing commands based on the information;
wherein the instrument module comprises an endpoint device; and
wherein the endpoint device comprises a non-contributing endpoint device to receive the information from the computer bus and to generate a signal based on the information to trigger operation of one or more of the resources.

3. The system of claim 1 or 2, wherein the host computer is programmed to output the commands to the instrument modules via a communication bus that is different from the computer bus.

4. The system of claim 1 or 2, wherein aggregating the status and distributing the information are performed independent of the host computer.

5. The system of claim 1 or 2, wherein at least some of the commands instruct resources in the domain to perform operations.

6. The system of claim 1 or 2, wherein the signal is to trigger a resource to perform an action for which the resource has been previously armed.

7. The system of claim 1, wherein an offset may be added to the signal to control signal timing relative to receipt of the information.

8. The system of claim 1 or 2, wherein the endpoint device comprises a transmitter to implement output to the computer bus, and a receiver to implement receiving from the computer bus.

9. The system of claim 1 or 2, further comprising a processor to perform a test;
wherein the status comprises a pass or fail status of the test performed by the processor.

10. The system of claim 1 or 2, wherein the computer bus comprises at least one of a wired-OR bus; point-to-point connections and logic gates; non-contact, wireless or optical signaling; or a combination of one or more of: a wired-OR bus; point-to-point connections and logic gates; non-contact, and wireless or optical signaling.

11. The system of claim 1 or 2, wherein the information is received over the computer bus.

12. The system of claim 1 or 2, wherein the information is received over a communication bus that is different than the computer bus.

13. The system of claim 1 or 2, wherein the sync command in the test flow immediately precedes, in the test flow, a command requiring action or measurement vis-à-vis a device under test by the test flow.

14. The system of claim 1 or 2, wherein at least part of the test flow is controllable not to be synchronized.

15. The system of claim 1 or 2, wherein the information is distributed after all instrument modules in the domain have encountered a sync command.

16. A system comprising:
a computer bus;
a host computer to execute test flows; and
instrument modules, an instrument module comprising:
resources; and
a processing device;
wherein resources operated on by a test flow define a domain;
wherein the host computer is configured to output commands including a sync command in the test flow to the instrument modules, the sync command for causing the instrument module to provide a status to the computer bus and to pause the processing device;
wherein statuses from the instrument modules in the domain are aggregated on the computer bus, and wherein information is distributed to the instrument modules based on the statuses aggregated;
wherein the processing device is configured to resume executing commands based on the information;
wherein the host computer is programmed to execute a test program that includes multiple, separate instruction flows, the multiple, separate instruction flows including the test flow;
wherein the instrument module comprises an endpoint device; and
wherein the endpoint device is configured to subscribe to one or more of the multiple, separate instruction flows.

17. A system comprising:
a computer bus;
a host computer to execute test flows; and
instrument modules, an instrument module comprising:
resources; and
a processing device;
wherein resources operated on by a test flow define a domain;
wherein the host computer is configured to output commands including a sync command in the test flow to the instrument modules, the sync command for causing the instrument module to provide a status to the computer bus and to pause the processing device;
wherein statuses from the instrument modules in the domain are aggregated on the computer bus, and wherein information is distributed to the instrument modules based on the statuses aggregated;
wherein the processing device is configured to resume executing commands based on the information; and
wherein the status comprises bits that are encoded in time-division-multiple-access fashion onto the computer bus using a periodic frame comprised of multiple bits.

18. The system of claim 17, wherein the periodic frame is characterized by one or more of headers, trailers, cyclic redundancy checks, or 8b/10b encoding.

19. A system comprising:
a computer bus;
a host computer to execute test flows; and
instrument modules, an instrument module comprising:
resources; and
a processing device;
wherein resources operated on by a test flow define a domain;
wherein the host computer is configured to output commands including a sync command in the test flow to the instrument modules, the sync command for causing the instrument module to provide a status to the computer bus and to pause the processing device;
wherein statuses from the instrument modules in the domain are aggregated on the computer bus, and wherein information is distributed to the instrument modules based on the statuses aggregated;
wherein the processing device is configured to resume executing commands based on the information; and
wherein at least some bits of the information represent a system time alignment signal to set system clock counters on the instrument modules to at least one of a specified value or a specified time that is in a payload on the computer bus.

20. A system comprising:
a computer bus;
instrument modules, an instrument module comprising:
resources; and
a processing device to execute commands from a queue;
wherein the processing device is configured, in response to encountering at least one sync command in the queue, to cause the instrument module to provide a status to the computer bus and to pause the processing device;
wherein statuses from the instrument modules are aggregated on the computer bus, and wherein information is distributed to the instrument modules based on the statuses aggregated;
wherein the processing device is configured to resume executing commands based on the information;
wherein the instrument module comprises an endpoint device to provide status to the computer bus;
wherein the endpoint device comprises a contributing endpoint device; and
wherein the contributing endpoint device is configured to receive the information from the computer bus and to generate a signal based on the information to trigger operation of one or more of the resources.

21. The system of claim 20, further comprising:
a host computer; and
a communication bus;
wherein the host computer is configured to output the commands to the instrument module via the communication bus.

22. A test system comprising:
instruments for controlling testing, each instrument being controlled by a processing unit, each processing unit being configured to operate on portions of a test program relevant to an instrument that the processing unit controls; and
a synchronization mechanism operating with at least some processing units to produce a synchronized sequence of actions, measurements, or measurements and actions at a test instrument interface absent intervention from a centralized controller;
wherein the synchronization mechanism is configured to:
enable each processing unit to transmit status data in response to a synch command, the status data indicating whether the processing unit has completed a portion of the test program;
receive and to aggregate status data across all processing units; and
transmit one or more aggregated status bits back to all processing units; and
wherein a processing unit among the at least some processing units is configured to resume execution based on the aggregated status bits.

23. The test system of claim 22, wherein the one or more aggregated status bits are usable to synchronize all instruments in the test system to synchronize a sequence of actions, a sequence of measurements, or a sequence of actions and measurements.

24. The test system of claim 22, wherein the status data comprises at least one bit to transmit pass or fail status of a test program.

25. The test system of claim 22, wherein the synchronization mechanism comprises at least one of a wired-OR bus; point-to-point connections and logic gates; non-contact, wireless or optical signaling; or a combination of one or more of: a wired-OR bus; point-to-point connections and logic gates; non-contact, and wireless or optical signaling.

26. The test system of claim 22, wherein at least part of the synchronization mechanism is controllable to be disabled either automatically or manually.

27. The test system of claim 22, wherein at least part of the synchronization mechanism is controllable to operate on only part of the test program.

28. A test system comprising:
instruments for controlling testing, each instrument being controlled by a processing unit, each processing unit being configured to operate on portions of a test program relevant to an instrument that the processing unit controls; and
a synchronization mechanism operating with at least some processing units to produce a synchronized sequence of actions, measurements, or measurements and actions at a test instrument interface absent intervention from a centralized controller;
wherein the synchronization mechanism is configured to:
enable each processing unit to transmit status data indicating whether the processing unit has completed a portion of the test program;
receive and to aggregate status data across all processing units; and
transmit one or more aggregated status bits back to all processing units; and
wherein a processing unit is configured to perform operations comprising: when the processing unit has completed a portion of the test program, the processing unit indicates, on a synchronization bus, that the processing unit has completed the portion of the test program and, before proceeding to a next portion of the test program, the processing unit receives the one or more aggregated status bits indicating that all other processing units in the test system have completed portions of the test program.

29. A test system comprising:
instruments for controlling testing, each instrument being controlled by a processing unit, each processing unit being configured to operate on portions of a test program relevant to an instrument that the processing unit controls; and a synchronization mechanism operating with at least some processing units to produce a synchronized sequence of actions, measurements, or measurements and actions at a test instrument interface absent intervention from a centralized controller;
wherein the synchronization mechanism is configured to:
enable each processing unit to transmit status data indicating whether the processing unit has completed a portion of the test program;
receive and to aggregate status data across all processing units; and
transmit one or more aggregated status bits back to all processing units; and
wherein the synchronization mechanism has a defined timing relative to system clocks so that multiple instruments can receive the one or more aggregated status bits and be triggered to perform an action, a measurement, or both an action and a measurement with predictable and repeatable timing alignment among multiple instruments.

30. The test system of claim 29, wherein the synchronization mechanism is configured to support status data comprising multiple status bits that are transmittable by each processing unit, and that can be aggregated to produce the one or more aggregated status bits, the one or more aggregated status bits being transmitted to all of the processing units.

31. A test system comprising:
instruments for controlling testing, each instrument being controlled by a processing unit, each processing unit being configured to operate on portions of a test program relevant to an instrument that the processing unit controls; and
a synchronization mechanism operating with at least some processing units to produce a synchronized sequence of actions, measurements, or measurements and actions at a test instrument interface absent intervention from a centralized controller;
wherein the synchronization mechanism is configured to:
enable each processing unit to transmit status data indicating whether the processing unit has completed a portion of the test program;
receive and to aggregate status data across all processing units; and
transmit one or more aggregated status bits back to all processing units; and
wherein the status data comprises one or more status bits that are encoded in time-division-multiple-access fashion onto a serial data bus using a periodic frame.

32. The test system of claim 31, wherein the periodic frame is characterized by one or more of headers, trailers, cyclic redundancy checks, or 8b/10b encoding.

33. The test system of claim 31, wherein the periodic frame is configurable to transmit information other than the one or more status bits.

34. A test system comprising:
instruments for controlling testing, each instrument being controlled by a processing unit, each processing unit being configured to operate on portions of a test program relevant to an instrument that the processing unit controls; and
a synchronization mechanism operating with at least some processing units to produce a synchronized sequence of actions, measurements, or measurements and actions at a test instrument interface absent intervention from a centralized controller;
wherein the synchronization mechanism is configured to:
enable each processing unit to transmit status data indicating whether the processing unit has completed a portion of the test program;
receive and to aggregate status data across all processing units; and
transmit one or more aggregated status bits back to all processing units; and
wherein at least some of the one or more aggregated status bits transmitted to the processing units represent a system time alignment signal to set system clock counters on the instruments to a specified value.

35. The test system of claim 34, wherein the one or more aggregated status bits comprises a single status bit to synchronize all instruments in the test system to synchronize a sequence of actions, a sequence of measurements, or a sequence of actions and measurements.

36. A system comprising:
a computer bus;
instrument modules, an instrument module comprising:
resources; and
a processing device to execute commands from a queue;
wherein the processing device is configured, in response to encountering at least one sync command in the queue, to cause the instrument module to provide a status to the computer bus and to pause the processing device;
wherein statuses from the instrument modules are aggregated on the computer bus, and wherein information is distributed to the instrument modules based on the statuses aggregated;
wherein the processing device is configured to resume executing commands based on the information;
wherein the instrument module comprises an endpoint device; and
wherein the endpoint device comprises a non-contributing endpoint device to receive the information from the computer bus and to generate a signal based on the information to trigger operation of one or more of the resources.

37. A system comprising:
a computer bus;
instrument modules, an instrument module comprising:
resources; and
a processing device to execute commands from a queue;
wherein the processing device is configured, in response to encountering at least one sync command in the queue, to cause the instrument module to provide a status to the computer bus and to pause the processing device;
wherein statuses from the instrument modules are aggregated on the computer bus, and wherein information is distributed to the instrument modules based on the statuses aggregated;
wherein the processing device is configured to resume executing commands based on the information; and
wherein the status comprises bits that are encoded in time-division-multiple-access fashion onto the computer bus using a periodic frame comprised of multiple bits.

38. A system comprising:
a computer bus;
instrument modules, an instrument module comprising:
resources; and a processing device to execute commands from a queue;

wherein the processing device is configured, in response to encountering at least one sync command in the queue, to cause the instrument module to provide a status to the computer bus and to pause the processing device;

wherein statuses from the instrument modules are aggregated on the computer bus, and wherein information is distributed to the instrument modules based on the statuses aggregated;

wherein the processing device is configured to resume executing commands based on the information; and wherein at least some bits of the information represent a system time alignment signal to set system clock counters on the instrument modules to at least one of a specified value or a specified time that is in a payload on the computer bus.

* * * * *